R. MALCOM.
GOGGLES.
APPLICATION FILED OCT. 29, 1917.
1,306,549.
Patented June 10, 1919.
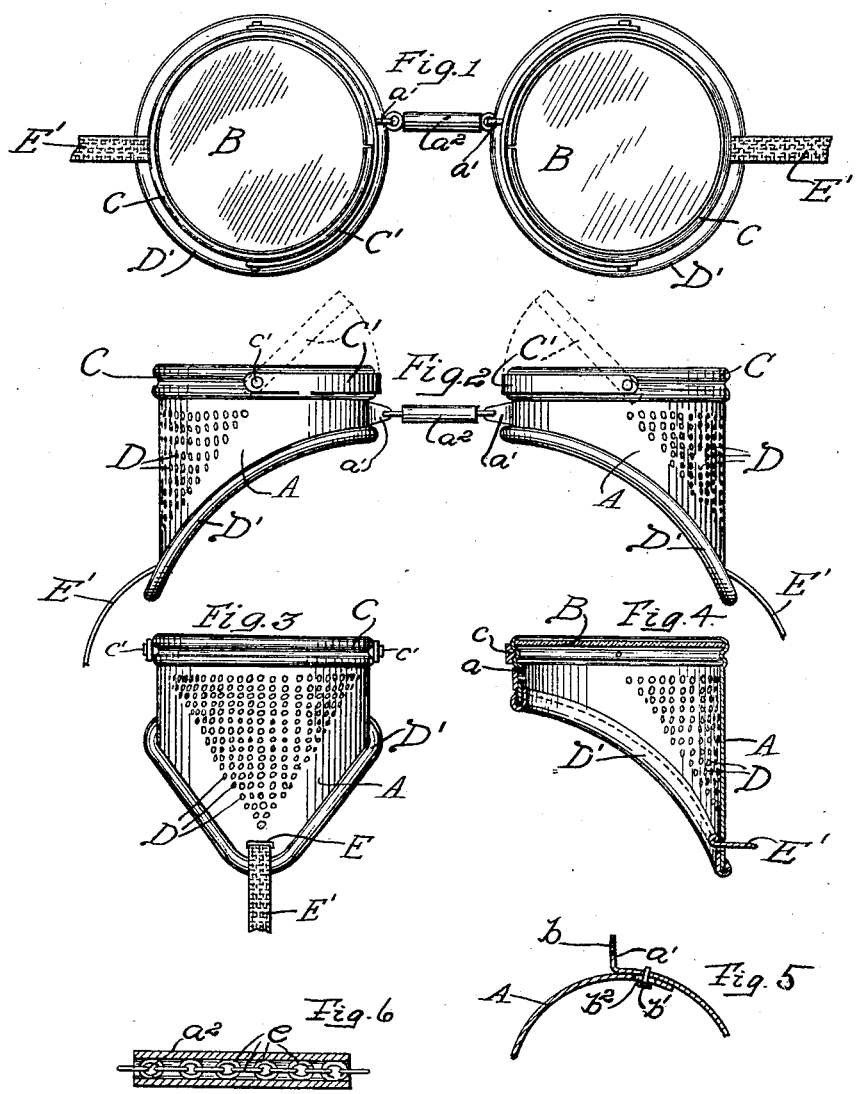
Inventor
Robert Malcom
By ⟨signature⟩
Attorney

UNITED STATES PATENT OFFICE.

ROBERT MALCOM, OF CHICAGO, ILLINOIS.

GOGGLES.

1,306,549.　　　　Specification of Letters Patent.　　Patented June 10, 1919.

Application filed October 29, 1917. Serial No. 198,943.

*To all whom it may concern:*

Be it known that I, ROBERT MALCOM, a citizen of the United States, residing at Chicago, Cook county, State of Illinois, have invented certain new and useful Improvements in Goggles, of which the following, taken in connection with the drawings, is a description.

My invention has for its object the production of a goggle or eye protector designed to be used by mechanics and other persons whose eyes are exposed to the dust, dirt, cinders and flying particles of various kinds, as well as the sun, wind, rain, etc., to afford protection to the eyes.

A further object of the invention is to provide a protector of the class described having a lens-retaining rim formed integrally with each eye cup and so constructed that the lenses contained therein may be easily removed when broken, or if desired to change the lenses for different colors.

A further object of the invention is to so construct the lens-holding rim that it is adjustable circumferentially without detaching any of the parts which would be liable to become lost, but to enable the change to be made by turning the semi-circular retaining band and expanding the lens-holding rim to release the lens and allow the replacement of a new lens, readjusting the band and the goggle is ready for use.

A further object of the invention is to provide a very simple and effective means for engaging the ends of the head band, whereby the same may be quickly and readily changed when desired, especially for sanitary reasons, and also when necessary to replace with a new band.

A further object of the invention is to provide a nose bridge which is more or less resilient and at the same time of non-absorbent material.

Other objects of my invention will be apparent to those skilled in the art, and will be further pointed out and explained in the accompanying specification.

In the drawings,

Figure 1 is a front elevation of my invention;

Fig. 2 is a side view of the same, with one of the retaining bands shown in dotted lines when raised to releasing position;

Fig. 3 is an end elevation of one of the eye cups;

Fig. 4 is a sectional view of the same;

Fig. 5 is a detail of the eye cup rim and means for securing the edges thereof together; and Fig. 6 is a sectional detail of the nose bridge.

Referring to the drawings, A represents a pair of eye cups, preferably stamped out of sheet metal, although other materials, such as leather, fiber, or the like, might be used if desired.

These cups are preferably cylindrical in form, with one side thereof elongated on a line diagonal to the axis, as shown in Figs. 2, 3 and 4, to extend toward the temples of the wearer and to conform more nearly to the features of the face. As each of these eye cups is a duplicate of the other, a description of one will suffice for both.

When the body of the cup is formed in the shape desired, it is bent into a cylinder, the meeting edges thereof being arranged on the short side of the eye cup, $a$, one of the edges having formed therein, and preferably integrally therewith, a tongue, $a'$, to which is attached a nose piece or bridge. The tongue, $a'$, overlaps the contiguous opposite edge of the eye cup, the end of said tongue being bent approximately at right angles to the cylinder, and having an opening, $b$, through the end thereof to which is attached one end of the nose piece, $a^2$.

A pin or projection, $b'$, extends from the cup body at one side of said tongue through a small slot or opening, $b^2$, in the overlapped portion of the opposite edge of the cylinder, thereby serving as a guide and permitting the slight expansion necessary for removing and replacing the lens, B.

A circumferential bead, C, is formed on each lens-holding rim, on which the edge of the lens, B, is seated, the edge of the rim, C, forming a slight flange or shoulder holding the lens securely in place.

C' is a semi-cylindrical retaining band or bail pivotally or hingedly secured at the ends thereof, $c'$, to the lens-holding rim upon either side of the meeting edges of said rim. This retaining band is provided with a boss or ridge, $c$, which engages a groove in the rim C, (Fig. 4) and by frictional engagement is held in place when the device is assembled.

When the lens is to be placed in the rim or removed, the retaining band, C', is raised, as shown in dotted lines in Fig. 2, and the rim expanded circumferentially, which releases the lens. When the lens is placed in position, the cylinder is closed around the edges thereof, the retaining band is lowered in place around the periphery of the rim, and the lens is very securely held in place.

A plurality of openings, D, are arranged in the side of the lens holding cup to provide suitable means for ventilation.

The outer rim of each of the eye cups is bound with a suitable binding, D', such for instance as leather, rubber, or the like, which may be stitched or otherwise attached to the edge of the eye cup.

Openings, E, are provided in the elongated end of each of the eye cups, through which are secured the ends of an elastic band, E', which extends around the head of the wearer to hold the goggles in place when worn.

A flexible nose piece connects each pair of eye cups by being linked with the tongues, $a'$. The nose piece in this instance is formed of link members, $e$, extending through a resilient, flexible casing, $a^2$, which rests upon the nose of the wearer.

I claim:

1. In a goggle, lens-holding cups formed by bending the frames thereof into the form of a cylinder with the meeting edges overlapped, means for adjusting said overlapping edges circumferentially and securing the same together, a lens in each of said eye cups, and a nose piece connecting each pair of lens-holding cups.

2. In a goggle, lens-holding cups comprising a cylinder elongated on one side in a line diagonal to the axis, each of said cylinders being adjustable circumferentially, means for retaining a lens in each of said cylinders, and means for retaining the lenses in place by frictional engagement.

3. In a goggle, lens-holding cups, each comprising a cylinder having one side elongated on a line diagonal to the axis, each of said cylinders being adjustable circumferentially, a lens in each of said cylinders, a retaining band movably secured in the periphery of each cylinder whereby the lens in each cylinder is held in fixed position, and a flexible connection between each pair of eye cups.

4. In a goggle, a pair of lens holding cups, each comprising a cylinder having one side elongated on a line diagonal to the axis, each of said cylinders being adjustable circumferentially, a lens in each cylinder, a retaining band movably secured to the periphery of each cylinder, said band being provided with a boss or projection which frictionally engages the peripheral edge of the cylinder to lock each cylindrical frame around the lens.

5. In a goggle, a pair of lens-holding cups, each comprising a cylinder having one side elongated on a line diagonal to the axis, each of said cylinders being adjustable circumferentially, a lens in each cylinder, a semi-cylindrical retaining band movably secured to the peripheral edge of the cylinder, the meeting edges of the cylinder overlapping and having a tongue extending at right angles thereto, and a flexible nose piece engaging each of said projecting tongues, substantially as described.

6. In a goggle, a pair of lens-holding cups, each comprising a cylinder having one side elongated on a line diagonal to the axis, said elongated side being provided with a plurality of apertures therethrough, said cylinders being adjustable circumferentially, the meeting edges of each cylinder overlapping, a pin or projection extending from one side of the overlapping edges into an opening formed in the opposite side, a retaining ring movably secured to the peripheral edge of the cylinder and adapted to close said cylinder around the edge of the lens and hold the same by frictional engagement.

7. In a goggle, the combination of a pair of lens-holding cups, each elongated on one side along a line diagonal to the axis, each of said cylinders being adjustable circumferentially, means for removably engaging a lens in each cylinder, a flexible connection between each pair of lens-holding cups, and means for securing the same upon the head of the wearer.

In testimony whereof I have signed this specification.

ROBERT MALCOM.

Copies of this patent may be obtained for five cents each, by addressing the "Commissioner of Patents, Washington, D. C."